United States Patent Office 3,574,707
Patented Apr. 13, 1971

3,574,707
BENZOIC ACID ESTERS OF MONOHYDROALKYL-
CARBORANES
Saiyid M. Naqvi, Dover, Martin J. Socha, Wayne, and
Marvin M. Fein, Westfield, N.J., assignors to Thiokol
Chemical Corporation, Bristol, Pa.
No Drawing. Original application Sept. 17, 1964, Ser. No.
397,292, now Patent No. 3,409,663. Divided and this
application July 1, 1968, Ser. No. 752,427
Int. Cl. C07c 69/76, 69/84
U.S. Cl. 260—476                                     2 Claims

ABSTRACT OF THE DISCLOSURE

Benzoic acid esters of monohydroxy-alkylcarboranes in which the alkyl group has from 1 to 8 carbon atoms. The esters have utility as ultraviolet light absorbants.

This is a division of application Ser. No. 397,292, filed Sept. 17, 1964, now Pat No. 3,409,663.

This invention concerns certain boron containing esters of aromatic acids, their preparation and their applications.

More particularly this invention relates to esters prepared by the reaction of carborane alcohols and carborane diols with aromatic acids. These esters are generally valuable as intermediates for preparing carborane derivatives and carborane polymers and in some instances are valuable as ultraviolet absorbers and protectants.

The term "carborane alcohols" as used throughout this application is used to describe compounds containing at least one carborane group as well as one or two reactive hydroxy groups whereas the term "carborane diols" as used herein describes compounds containing at least one carborane group as well as two reactive hydroxy groups.

Carborane is the generic term used to describe all the isomers of the dicarbacyclododecarborane of the empirical formula: $B_{10}H_2H_{12}$.

The term "carboranyl" is the name given to the radical of the ortho carborane isomer shown below:

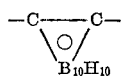

The ortho isomer is also referred to by the Greek letter theta, abbreviated as $\theta$.

The radical of the para-isomer of carborane is referred to herein as paracarboranyl.

The radical of the meta isomer of carborane is referred to as "neocarboranyl," abbreviated as 0.

The term "aromatic acid(s)" as used throughout this application refers to aromatic acid type reactants having an aromatic nucleus and at least one free carboxylic acid, acid anhydride, ester or acid chloride groups attached thereto. In addition to its carboxylic acid or acid chloride substituents, the aromatic nucleus can have other substituents, such as halogen, hydroxy, alkoxy and the like.

It is an object of this invention to prepare novel carborane esters.

It is an additional object of this invention to prepare compositions useful as ultraviolet absorbers and protectants.

A further object of this invention is to prepare polymer intermediates and additives.

The other objects of this invention will become apparent after a further perusal of this application.

The above objects among others are achieved through the preparation of the esters of this invention.

In practice, a carborane reactant selected from the group of carborane alcohols or carborane diols is contacted with an aromatic acid type reactant as previously described, under the usual conditions of esterification, namely elevated temperatures and dehydration catalysts.

As the preceding description indicates, considerable variation is possible insofar as the choice of carborane reactant and aromatic acid type reactant is concerned.

For example, any of the following illustrative carborane alcohols or carborane diols can be used as sources of the hydroxyl group; the 1-hydroxyalkylcarboranes such as 1-hydroxymethylcarborane, 1-hydroxyethylcarborane, the 1-hydroxypropylcarboranes, the 1-hydroxybutylcarboranes and the like, the 1-hydroxyalkylneocarboranes such as 1-hydroxybutylneocarboranes, the 1-hydroxypentylneocarboranes, etc., the 1,2-bis-(1-hydroxyalkyl)carboranes such as 1,2 - bis - hydroxymethylcarborane, 1,2 - bis - (hydroxyethyl)carborane, the 1,2-bis-(1-hydroxypropyl)carboranes, the 1,2-bis-(1-hydroxybutyl)carboranes, etc., as well as the bis-(hydroxyalkyl)neocarboranes. These include bis - (hydroxymethyl)neocarborane, bis - (hydroxyethyl)neocarborane, the bis - (hydroxypropyl)neocarboranes, the bis-(hydroxybutyl)neocarboranes among others. Also included within the scope of carborane alcohols and carborane diols are those carboranes having a free hydroxy function as well as other inert functions. For example, carboranes having an ether function as well as an alcohol or diol function can be used as the carborane reactant, illustrative compounds of this type are: bis-(2-$\beta$ - hydroxyethyl - 1 - carboranylmethyl) ether, bis-(2-hydroxymethyl - 1 - carboranylmethyl) ether and the corresponding neocarboranyl ethers. The favored carborane reactants are the mono- and bis(hydroxyalkyl) carboranes and bis(hydroxyalkyl) neocarboranes wherein the alkyl groups have 1–8 carbon atoms. Within this favored group the preferred reactants of this invention are the mono- and bis(hydroxyalkyl) carboranes wherein the alkyl group has from 1–8 carbon atoms. These reactants are preferred because the resultant esters are good ultraviolet absorbers and the reactants are more readily available.

Among the many aromatic carboxylic acid type reactants which can be used are the following: aromatic monocarboxylic acids including benzoic acid, the toluic acids, the phenylalkylacetic acids such as phenylacetic acid and $\beta$-phenylpropionic acid, unsaturated aromatic carboxylic acids such as cinnamic acid, polybasic aromatic carboxylic acids such as phthalic acid and its isomers and the like. Typical aromatic acid halides include the following: benzoyl chloride, toluyl chloride, phthalyl chloride and the like. The favored aromatic acid type reactants are the benzoic acids and the toluic acids, the terephthalic, isophthalic acids, phthalic anhydride and the corresponding acid chlorides.

Further latitude exists in the solvents choice of reaction conditions such as the use of temperature, pressure and time used to prepare the novel compounds of this invention. For example, the esterification ordinarily takes place in the presence of an inert solvent such as the aromatics. When such a solvent is used, i.e. benzene, the water formed during esterification is taken off as the water-benzene azeotrope using an appropriate apparatus such as a Dean-Stark condenser. When the aromatic carboxylic acids are used as reactants an esterification catalyst such as p-toluenesulfonic acid is used as catalyst. Other catalysts include concentrated sulfuric acid, anhydrous HCl, $HF_3$ and the like. When these same carboxylic acids are used as reactants, the reactions are preferably run at the reflux temperature of the inert solvent. However, lower temperatures can be used but the reaction time is substantially lengthened. Under these preferred conditions the reaction time cannot be stated with precision but ordinarily the esterifications are complete within 12–24 hours.

When the aromatic acid chlorides are used as reactants, generally milder reaction conditions are required. For instance, the acid chloride is ordinarily added slowly to a stirred solvent solution of the alcohol at a temperature ranging from 15–50° C. After the addition is complete the reaction mixture is raised to about 60–120° C. for several hours to complete the reaction. The HCl byproduct can be removed by a number of methods including flushing the reaction mixture with an inert gas. The use of an inert atmosphere is not required unless an easily oxidizable substituent is present on the aromatic nucleus. Similarly the use of superatmospheric pressure while permissible is not required.

The reaction time for esterification is shorter when the acid chlorides are used usually ranging between 2–12 hours.

When either the carboxylic acid, anhydride, ester or the acid chloride is used as reactant, an excess of the aromatic carboxylic acid type reactant is used over that required by stoichiometry but this is not a necessity.

The isolation and purification procedures used are comparable to that employed in organic chemistry for isolating and purifying esters of the aliphatic alcohols and for that reason will not be elaborated upon. Specific details appear in the embodiments and examples which follow.

In one embodiment of this invention, the neocarboranylmethyl ester of salicylic acid is prepared as follows:

Mix neocarboranylmethyl alcohol and salicylic acid in 300 ml. of benzene in a reaction vessel fitted with a Dean-Stark apparatus. The two reactants are present in the ratio of 1:1.05 respectively. A catalytic quantity of p-toluenesulfonic acid is added and the reaction mixture is brought to reflux. During 8 hours of refluxing the water is removed as a water-benzene azeotrope. The reaction mixture is cooled down, filtered and the benzene stripped off under vacuum. The residue is treated with aqueous NaHCO₃ to reserve unreacted salicylic acid and the ester product is recrystallized from heptane, three times to give a colorless product, whose ultraviolet and infrared spectra and elemental analysis confirms to be the expected product.

In another embodiment, add 0.55 mole of phthalyl chloride in 50 ml. of xylene to a stirred solution of 0.25 mole of neocarboranylbutyl alcohol (1-hydroxybutylneocarborane) in 150 ml. of xylene. After the addition is complete, raise the temperature to 80° C. for 4 hours. At the end of this time flush with nitrogen and cool to room temperature and strip off the xylene under vacuum. Neutralize with an aqueous solution of 5% NaHCO₃ and filter to recover the desired di(-neocarboranylbutyl) ester of phthalic acid.

Another embodiment is demonstrated by the following preparation of the neocarboranylmethyl ester of p-chlorobenzoic acid.

Slowly add a solution of 0.15 mole of p-chlorobenzoyl chloride in 100 ml. of benzene to a stirred solution of 0.1 mole of hydroxymethylneocarborane. After the addition is complete, raise the temperature to 75–80° C. and heat for 3 hours. Flush, cool and strip off solvent as above.

Yet another embodiment is demonstrated by the preparation of the neocarboranylethyl ester of m-ethyl benzoic acid.

To prepare this ester, add a solution of 0.25 mole of m-ethyl benzoyl chloride in 100 ml. of toluene to a solution of 0.20 mole of (1-hydroxyethyl)neocarborane in 100 ml. benzene. After the addition of acid chloride is complete, raise the temperature to 80° C. and continue heating for 6 hours. Isolate and purify the ester as above to prepare an analytically pure sample.

Still a further embodiment is the preparation of neocarboranylmethyl di-ester of salicylic acid.

To prepare this ester, slowly add a solution of 0.25 mole of o-hydroxybenzoyl chloride in 100 ml. of benzene to 100 ml. solution of benzene containing 0.10 mole of bis-(hydroxymethyl) neocarborane. Heat to 80° C. for 5 hours after the addition is complete and isolate and purify the ester as described previously.

In still a further embodiment, the neocarboranylethyl di-ester of ortho n-butyl benzoic acid is prepared as follows:

Add 0.25 mole of o-butyl benzoyl chloride in 100 ml. of benzene to a stirred solution of 100 ml. of benzene containing 0.10 mole of bis-(hydroxyethyl) neocarborane. After the addition is complete, heat to 75° C. for 6 hours. Then flush with nitrogen to remove HCl and strip under vacuum to remove benzene. Neutralize with 5% aqueous sodium bicarbonate solution and filter to get the crude ester product. The pure ester can be obtained by recrystallization from cyclohexane.

In comparable embodiments the following alkylcarborane esters of benzoic and substituted benzoic acids are prepared.

To prepare carboranylmethyl salicylate (carboranylmethyl ester of salicylic acid), combine 1-hydroxymethylcarborane (0.11 mole) and salicylic acid (0.1 mole) and 300 ml. of benzene in the presence of p-toluenesulfonic acid in a reaction vessel fitted with a Dean-Stark apparatus. Reflux for 6 hours and remove the water formed through the water-benzene azeotrope. At the end of this time filter and strip off the benzene under vacuum. The residue is treated with aqueous sodium bicarbonate to remove untreated salicylic acid. Recrystallize the solid ester from heptane three times to give colorless, needle-like crystals melting 112.5–114° C.

*Analysis.*—Calcd. for $C_{10}H_{18}B_{10}O_3$: C, 40.8; H, 6.16; B, 36.72. Found: C, 40.89; H, 6.54; B, 36.51.

The UV spectrum (cyclohexane) reveals two maxims:

$$\epsilon_{311.5}^{4.48\times10^3}; \ \epsilon_{243.0}^{1.0\times10^4}$$

To prepare carboranylmethyl benzoate (the carboranylmethyl ester of benzoic acid) mix 1-carboranylmethyl alcohol (8.8 g., 0.05 mole); benzoic acid (6.1 g., 0.05 mole), p-toluenesulfonic acid 2 g., and 5 ml. of concentrated sulfuric acid in 100 ml. of benzene and reflux for three hours, removing water formed as a water-benzene azeotrope using the Dean-Stark trap. Cool the reaction mixture and neutralize with 10% NaHCO₃ solution. Separate the organic layer and strip off the solvent removed under vacuum. Recrystallize the solid residue several times from n-hexane to give colorless crystalline carboranylmethyl benzoate product, M.P. 95–96° C.

*Analysis.*—Calcd. for $C_{10}H_{18}B_{10}O_2$: C, 43.42; H, 6.51; B, 38.32. Found: C, 43.41; H, 6.74; B, 38.13.

The UV spectrum (cyclohexane) reveals three maxims:

$$\epsilon_{281.1}^{8.6\times10^3}; \ \epsilon_{273.1}^{9.\times10^3}; \ \epsilon_{232.1}^{1.05\times10^4}$$

To prepare carboranylmethyl [(ortho-methoxy)benzoate], heat 175 ml. of toluene containing carboranylmethyl alcohol (8.7 g., 0.05 mole) to 65° C. under nitrogen atmosphere. To this hot solution add 9.5 g. (0.055 mole) of ortho-methoxybenzoyl chloride dropwise over a period of 15 minutes. Heat the mixture to 75° C. for 3 hours. Flush the reaction mixture with nitrogen to remove the residual hydrogen chloride gas. Cool the reaction mixture to room temperature and remove the toluene under vacuum. Neutralize the residue with 5% sodium bicarbonate solution and filter to get the crude carboranylmethyl-(o-methoxy)benzoate, M.P. 83–85° C. Recrystallize the crude product three times from cyclohexane to give colorless fine needles of product M.P. 86–87° C.

*Analysis.*—Calcd. for $C_{11}H_{20}B_{10}O_3$: C, 42.7; H, 6.49; B, 35.0. Found: C, 41.67; H, 6.34; B, 34.62.

The UV spectrum (cyclohexane) reveals two maxims:

$$\epsilon_{236}^{5.8\times10^3}; \ \epsilon_{296}^{3.7\times10^3}$$

To prepare carboranylmethyl [(para-methoxy)benzoate] add 9.4 g. (0.055 mole) of para-methoxybenzoyl chloride dropwise to 8.7 g. (0.05 mole) of carboranylmethyl alcohol in 100 ml. toluene under nitrogen. Heat the mixture for two hours at 100° C. and work-up the product as in the previous embodiments. A crude product is obtained, M.P. 98–102° C. Upon recrystallization twice from cyclohexane a colorless fine needle-like product is obtained, M.P. 102–104° C.

*Analysis.*—Calcd. for $C_{11}H_{20}B_{10}O_3$: C, 42.7; H, 6.49. Found: C, 42.26; H, 6.59.

The UV spectrum (cyclohexane) reveals one maxim:

$$\epsilon^{2.8=10^5}_{260.5}$$

To obtain 1,2-bis [(o-hydroxy)benzoyloxymethyl] carborane reflux a mixture of bis(hydroxymethyl)carborane (10 g., 0.05 mole), salicylic acid (15.2 g., 0.11 mole), 3 g. para-toluenesulfonic acid and 1.3 ml. of concentrated sulfuric acid in 150 ml. of dry benzene. After 2.0 hours refluxing, collect the water produced as the benzene azeotrope. Cool the reaction mixture and strip off the solvent under vacuum. Neutralize the residue with 3% sodium bicarbonate solution and filter to yield the crude 1,2-bis [(o-hydroxy)benzoyloxymethyl] carborane, M.P. 166–168° C. When recrystallized from cyclohexane a needle-like material, M.P. 175–176° C. was obtained.

*Analysis.*—Calcd. for $C_{18}H_{24}B_{10}O_6$: C, 47.9; H, 5.45; B, 24.4. Found: C, 48.01; H, 5.74; B. 24.72.

The UV spectrum (cyclohexane) reveals two maxims:

$$\epsilon^{9.1 \times 10^3}_{313}; \epsilon^{1.85 \times 10^4}_{242.6}$$

To prepare 1,2 - bis[(o-methoxy)benzoyloxymethyl] carborane, heat 10 g. (0.05 mole) quantity of bis(hydroxymethyl)carborane in 150 ml. of dry toluene to 65° C. under a nitrogen atmosphere. Add ortho-methoxybenzoyl chloride (18.7 g., 0.11 mole) dropwise over a period of 15 minutes. Heat the mixture to 80° C. for a three hour period until the evolution of hydrogen chloride subsides. Cool the reaction mixture to room temperature with continuous nitrogen sweep to remove all hydrogen chloride. Remove the solvent under vacuum, dry, and recrystallize twice from cyclohexane to give a colorless needle-like solid product M.P. 100–102° C.

*Analysis.*—Calcd. for $C_{20}H_{28}B_{10}O_6$: C, 51.0; H, 5.97. Found: C, 51.3; H, 6.51.

The UV spectrum (cyclohexane) reveals two maxims:

$$\epsilon^{1.04=10^5}_{235.5}; \epsilon^{7.38 \times 10^3}_{297}$$

To prepare 1,2-bis[(p - methoxy)benzoyloxymethyl] carborane, heat a mixture of bis(hydroxymethyl)carborane (10 g., 0.05 mole) and para-methoxybenzoyl chloride (18.7 g., 0.11 mole) in 150 ml. of dry toluene at 75° C. for a three hour period until the HCl is evolved. Work-up the crude product, 1,2-bis[(p-methoxy)benzoyloxymethyl] carbonane, M.P. 100–102° C. and recrystallize the compound twice from cyclohexane to yield a colorless solid. M.P. 103–104° C.

*Analysis.*—Calcd. for $C_{20}H_{28}B_{10}O_6$: C, 51.0; H, 5.97; B, 22.91. Found: C, 50.68; H, 6.17; B, 22.67.

The UV spectrum (cyclohexane) reveals one maxim:

$$\epsilon^{4.3 \times 10^4}_{259}$$

Another representative ester which can be prepared is carboranylmethyl o-toluate. This compound was prepared by refluxing a reaction mixture of 0.2 mole of o-toluyl chloride, 0.2 mole of hydroxymethylcarborane and 130 ml. of toluene for 6 hours. After recrystallization from heptane a pure ester product was obtained whose structure was proved by elemental analysis.

Yet another ester which can be prepared is the carboranylmethyl cinnamate. This compound was prepared by refluxing a reaction mixture of cinnamoyl chloride (0.2 mole), hydroxymethylcarborane (0.2 mole) and xylene (150 ml.) for 5 hours. After recrystallization from hexene a crystalline product was obtained whose structure was proved by elemental analysis.

To prepare the tri-(carboranylmethyl) ester of trimesic acid (1,3,5-benzenetricarboxylic acid) heat (0.16 mole) quantity of bis(hydroxymethyl) carborane in 150 ml. of dry toluene to 65° C. under a nitrogen atmosphere. Add trimesic acid (0.05 mole) dropwise over a period of 15 minutes. Heat the mixture to 80° C. for a three hour period to remove water as an azeotrope. Cool the reaction mixture to room temperature with continuous nitrogen sweep to remove all hydrogen chloride. Remove the solvent under vacuum, dry, and recrystallize twice from cyclohexane to give the purified triester product. Elemental analysis was used to establish the purity of the product.

To prepare the dicarboranylmethyl ester of terephthalic acid, heat a mixture of bis(hydroxymethyl)carborane (0.11 mole) and terephthalyl chloride (0.05 mole) in 150 ml. of dry toluene at 75° C. for a three hour period until the HCl is evolved. Work-up the crude diester product and recrystallize the compound twice from cyclohexane to yield a solid which was shown to be the desired product by analysis.

To prepare the diester from bis-(2-hydroxymethyl-1-carboranylmethyl) ether of benzoic acid, heat 0.2 mole of the above ether with 0.4 mole of benzoyl chloride in 150 ml. of dry toluene at 80° C. for 4 hours until evolution of HCl was substantially complete. Work-up and recrystallization yielded a solid ester product which was confirmed by elemental analysis.

This invention is advantageous in both its composition and process aspects.

For example, in its composition aspect this invention offers a series of novel compounds useful as organic intermediates, polymer intermediates and as additives for stabilizing materials toward ultraviolet attack.

In its process aspects, this invention offers several advantages including good yields, flexible reaction conditions, a wide choice of reactants and availability of these reactants. For instance, the aromatic carboxylic acid type reactants such as the preferred aromatic mono- and dibasic acids, and acid chlorides are known compounds in some instances available in commercial quantities. The carbonane reactants such as the mono-hydroxyalkylcarboranes and the bis(hydroxyalkyl)carboranes can be prepared by a number of methods.

For example, the 1,2-bis(hydroxylkyl)carborane reactants of this invention may be prepared by the interaction of the diacetate ester of the appropriate acetylenic diol and 6,9-bis(acetonitrile) decaborane to yield the 1,2-bis(acetoxyalkyl) carborane. This intermediate is then hydrolysed is either aqueous acid or base to yield the 1,2-bis(hydroxyalkyl) carborane. For example, the lowest member of the series, 12-bis(hydroxymethyl) carborane, is prepared by reacting 1,4-diacetoxy-2-butyne with 6,9-bis(acetonitrile) decaborane until the 1,2-bis(acetoxymethyl) carborane is prepared in substantial amount and then hydrolysis with aqueous hydrogen chloride to 1,2-bis(hydroxymethyl) carborane. This diol can also be prepared by reducing 1,2-bis(acetoxymethyl) carborane with lithium aluminum hydride.

The 1-hydroxyalkylcarborane or mono-hylroxyalkyl-carborane reactants are prepared similarly by contacting the monoacetate esters of the appropriate acetylenic monohydric alcohol with 6,9-bis(acetonitrile) decaborane to yield the 1-(acetoxyalkyl) carborane and hydrolyzing in aqueous acid or base to form the 1-hydroxyalkylcarborane. For example, the lowest member of the series, 1-hydroxymethyl carborane, can be prepared by reacting propargyl acetate with bis(acetonitrile) decaborane and hydrolyzing the intermediate to the 1-hydroxymethylcarborane. A description of the preparation of those compounds in which one or more alkyl, aryl or halogens are substituted for one or more of the boronic hydrogens appears in Inorg. Chem., vol. 2, No. 6 published in December 1963.

The bis(hydroxyalkyl) neocarborane reactants may be prepared among other methods through the dilithium derivatives of neocarborane i.e. neo-Li-C-$B_{10}H_{10}$-C-Li. For example, bis(hydroxyethyl) neocarborane may be prepared by reacting neo-Li-C-$B_{10}H_{10}$-C-Li with 2 moles of ethylene oxide. The higher and lower homologues can be prepared by using the appropriate Grignard reactant of neocarborane molecule and ethylene oxide.

Similarly the mono-hydroxylneocarborane can be prepared by reacting the monolithium neocarborane (neo-Li-C-$B_{10}H_{10}$-CH) or appropriate Grignard reagent with the same class of reactants, i.e. ethylene oxide.

As the numerous embodiments indicate modifications of reaction conditions, reactants and the like can be made without departing from the inventive concept.

While all of the ester compositions of this invention are of interest as intermediates, the preferred esters are the benzoic and salicylic esters of the hydroxyalkylcarboranes in which the alkyl group has from 1–8 carbon atoms and where the aromatic nucleus can contain one or more additional inert substituents such as lower alkyl, lower alkoxy, halogen and hydroxy. These esters are readily prepared from commercially available aromatic acid or the acid chlorides and are good ultraviolet absorbers. These salicylic and benzoic esters are advantageous compared to the aliphatic esters of the carborane alcohols and diole in that the aromatic esters are potent U.V. absorbers and the aliphatic esters are not. Further, the aromatic esters of this invention have much greater thermal stability than do the corresponding aliphatic esters and for this reason can be used as heat transfer materials where the aliphatic materials would be unsatisfactory.

The metes and bounds of this invention are best defined by the claims which follow.

We claim:
1. A benzoic acid ester of monohydroxyalkylcarboranes and di-hydroxyalkylcarboranes, said groups having from 1–8 carbon atoms.
2. Carboranylmethyl benzoate.

References Cited
UNITED STATES PATENTS

| 3,203,979 | 8/1965 | Ager et al. | 260—491 |
| 3,135,786 | 6/1964 | Ager, Jr. et al. | 260—606.5 |
| 3,437,688 | 4/1969 | Schwartz | 260—476 |

CHARLES B. PARKER, Primary Examiner
R. S. WEISSBERG, Assistant Examiner

U.S. Cl. X.R.

260—437R, 474, 606.5B